(12) United States Patent
Fujimoto et al.

(10) Patent No.: US 10,783,233 B2
(45) Date of Patent: Sep. 22, 2020

(54) APPARATUS AUTHENTICATION SYSTEM, MANAGEMENT DEVICE, AND APPARATUS AUTHENTICATION METHOD

(71) Applicant: FUJITSU LIMITED, Kawasaki-shi, Kanagawa (JP)

(72) Inventors: Shingo Fujimoto, Yokohama (JP); Jun Kakuta, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 324 days.

(21) Appl. No.: 15/855,761

(22) Filed: Dec. 27, 2017

(65) Prior Publication Data
US 2018/0124028 A1 May 3, 2018

Related U.S. Application Data

(63) Continuation of application No. PCT/JP2015/069969, filed on Jul. 10, 2015.

(51) Int. Cl.
*G06F 21/44* (2013.01)
*H04W 12/08* (2009.01)
(Continued)

(52) U.S. Cl.
CPC ........... *G06F 21/44* (2013.01); *H04L 9/3228* (2013.01); *H04L 63/062* (2013.01);
(Continued)

(58) Field of Classification Search
None
See application file for complete search history.

(56) References Cited

U.S. PATENT DOCUMENTS 6,952,775 B1 * 10/2005 Miura .................... G06F 21/34
713/182
6,965,674 B2 * 11/2005 Whelan ................. H04L 9/0891
380/270
(Continued)

FOREIGN PATENT DOCUMENTS

JP 2000-29841 1/2000
JP 2005-39787 2/2005
(Continued)

OTHER PUBLICATIONS

Gong et al.; A novel one-time password mutual authentication scheme on sharing renewed finite random sub-passwords; 2013; retrieved from the internet at: https://www.sciencedirect.com/science/article/pii/S0022000012001249; pp. 1-9, as printed. (Year: 2013).*
(Continued)

*Primary Examiner* — Saleh Najjar
*Assistant Examiner* — Michael W Chao
(74) *Attorney, Agent, or Firm* — Staas & Halsey LLP

(57) ABSTRACT

A management device includes a counter that counts the first number of times authentication of a first communication device has been successful, a generating unit that generates a first password based on the first number of times, and a sending unit that sends a registration request that requests registration of the first password. The first communication device includes a counter that counts the second number of times authentication of the first communication device has been successful, a generating unit that generates a second password based on the second number of times, and a sending unit that sends a connection request that includes the second password. A second communication device includes a receiving unit that receives the registration request and the connection request and a determination unit that compares the first password with the second password and determines
(Continued)

whether authentication of the first communication device is successful.

9 Claims, 10 Drawing Sheets

(51) Int. Cl.
| | |
|---|---|
| *H04L 29/06* | (2006.01) |
| *H04W 12/06* | (2009.01) |
| *H04L 9/32* | (2006.01) |
| *H04W 12/00* | (2009.01) |
| *H04L 29/08* | (2006.01) |

(52) U.S. Cl.
CPC ........ *H04L 63/083* (2013.01); *H04L 63/0838* (2013.01); *H04L 63/0846* (2013.01); *H04L 63/0853* (2013.01); *H04W 12/06* (2013.01); *H04W 12/08* (2013.01); *H04L 67/12* (2013.01); *H04W 12/003* (2019.01)

(56) References Cited

U.S. PATENT DOCUMENTS

| | | | | |
|---|---|---|---|---|
| 8,453,222 | B1* | 5/2013 | Newstadt | H04L 63/105 726/4 |
| 8,683,564 | B2* | 3/2014 | Khan | H04L 9/3228 713/168 |
| 9,654,467 | B1* | 5/2017 | Juels | H04L 63/0846 |
| 10,083,308 | B2* | 9/2018 | Jakobsson | G06F 21/602 |
| 10,554,624 | B2* | 2/2020 | Ott | H04L 63/0815 |
| 10,581,827 | B2* | 3/2020 | Venkatanaranappa | H04L 63/0815 |
| 10,594,680 | B2* | 3/2020 | Sethi | H04B 10/1149 |
| 2002/0062452 | A1* | 5/2002 | Ford | G06F 21/31 726/7 |
| 2004/0151317 | A1* | 8/2004 | Hyyppa | H04W 12/04 380/277 |
| 2005/0021959 | A1 | 1/2005 | Tsushima et al. | |
| 2005/0124288 | A1* | 6/2005 | Karmi | H04L 12/5692 455/3.01 |
| 2006/0005237 | A1* | 1/2006 | Kobata | H04L 63/0823 726/12 |
| 2006/0018481 | A1 | 1/2006 | Nagano et al. | |
| 2006/0059344 | A1* | 3/2006 | Mononen | H04L 63/061 713/171 |
| 2007/0101152 | A1* | 5/2007 | Mercredi | G06F 21/34 713/185 |
| 2007/0157024 | A1 | 7/2007 | Miller | |
| 2008/0320566 | A1* | 12/2008 | Herzog | G06F 21/33 726/4 |
| 2009/0323555 | A1* | 12/2009 | Lancaster | H04L 41/0253 370/254 |
| 2010/0017860 | A1* | 1/2010 | Ishida | G06F 21/31 726/7 |
| 2010/0153711 | A1* | 6/2010 | Koo | H04L 63/0823 713/156 |
| 2011/0138483 | A1* | 6/2011 | Bravo | G06F 21/35 726/29 |
| 2012/0030047 | A1* | 2/2012 | Fuentes | G06Q 20/04 705/26.1 |
| 2013/0023241 | A1* | 1/2013 | Lim | H04W 12/06 455/411 |
| 2013/0179692 | A1* | 7/2013 | Tolba | H04L 63/08 713/179 |
| 2013/0191899 | A1* | 7/2013 | Eldefrawy | H04L 9/3228 726/6 |
| 2013/0268444 | A1* | 10/2013 | Namgoong | G06Q 20/40145 705/71 |
| 2013/0333006 | A1* | 12/2013 | Tapling | G06F 21/42 726/6 |
| 2014/0082700 | A1* | 3/2014 | Hatano | G06F 21/36 726/4 |
| 2014/0115677 | A1* | 4/2014 | Popp | H04L 9/0863 726/6 |
| 2016/0364555 | A1* | 12/2016 | Child | G06F 21/31 |
| 2017/0148019 | A1* | 5/2017 | Carrott | G06Q 20/3829 |
| 2018/0219851 | A1* | 8/2018 | Woo | H04L 9/321 |

FOREIGN PATENT DOCUMENTS

| | | |
|---|---|---|
| JP | 2008-124810 | 5/2008 |
| JP | 2009-3501 | 1/2009 |
| JP | 2009-513089 | 3/2009 |
| JP | 2014-123228 | 7/2014 |
| WO | WO 2005/004385 A1 | 1/2005 |

OTHER PUBLICATIONS

Janevski et al.; Integrated AAA System for PLMN-WLAN Interworking; 2005; Retrieved from the Internet https://ieeexplore.ieee.org/abstract/document/1572126 ; pp. 1-4, as printed. (Year: 2005).*
International Search Report dated Sep. 29, 2015 in corresponding International Patent Application No. PCT/JP2015/069969.
Written Opinion of the International Searching Authority dated Sep. 29, 2015 in corresponding International Patent Application No. PCT/JP2015/069969.

* cited by examiner

FIG.3

| IoT TERMINAL ID | COUNTER VALUE |
|---|---|
| 00-00-0E-11-22-33 | 1 |
| 00-00-0E-11-24-24 | 3 |
| ⋮ | ⋮ |

FIG.4

| IoT TERMINAL ID | MASTER KEY |
|---|---|
| 00-00-0E-11-22-33 | 45fcaa8d23⋯ |
| 00-00-0E-11-24-24 | bda6694df1⋯ |
| ⋮ | ⋮ |

FIG.10

| INTERNAL ID | IoT TERMINAL ID | PASSWORD | REGISTRATION DATE AND TIME | EXPIRATION DATE |
|---|---|---|---|---|
| Lamp-1 | 00-00-0E-11-22-33 | 9ea0e60f47… | 2015/5/5 10:24 | 2016/5/4 0:00 |
| Lamp-2 | 00-00-0E-11-24-24 | | | |
| Aircon-1 | 00-00-0E-34-24-22 | 09a45de121… | 2015/7/2 13:30 | 2016/7/1 0:00 |
| … | … | … | … | … |

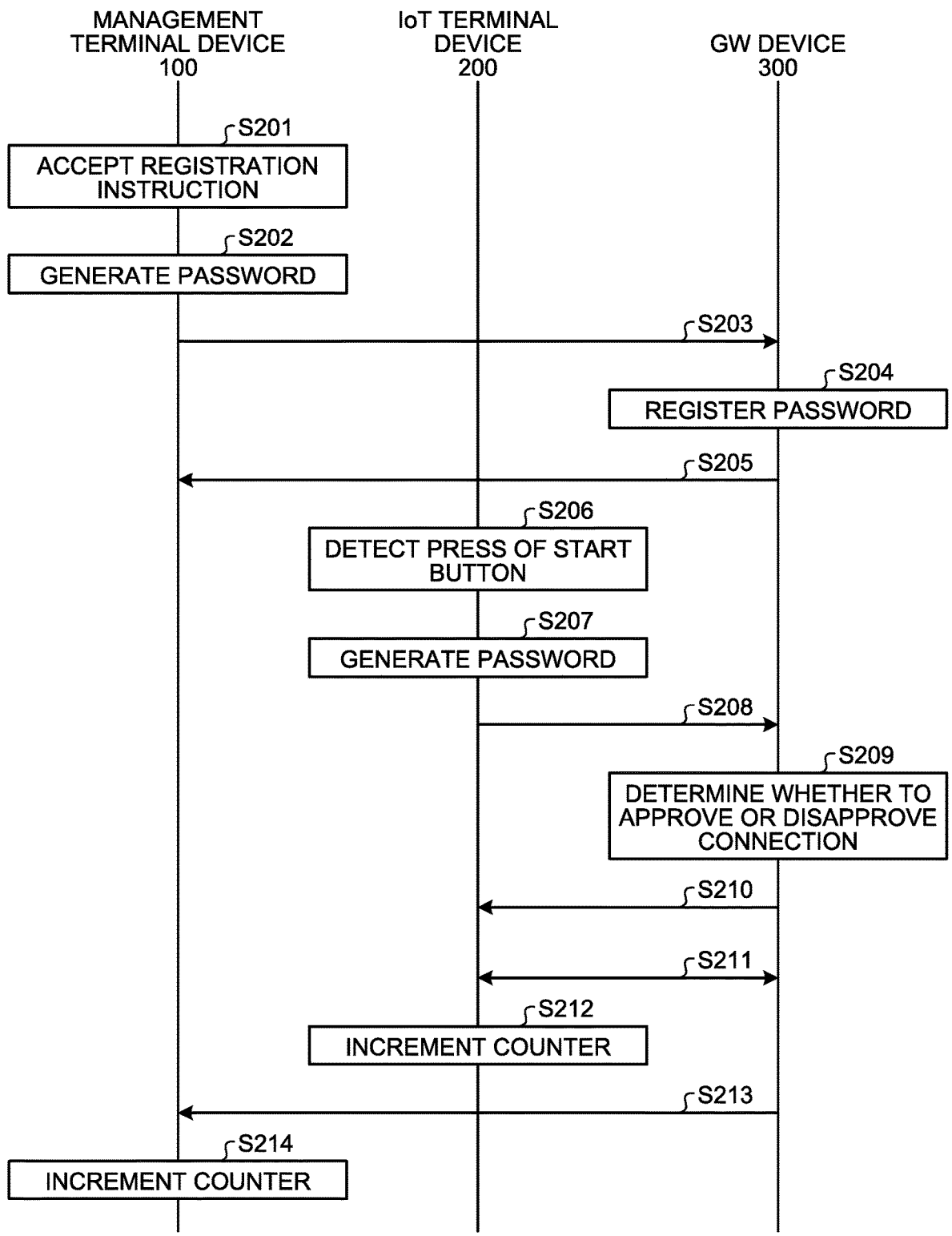

APPARATUS AUTHENTICATION SYSTEM, MANAGEMENT DEVICE, AND APPARATUS AUTHENTICATION METHOD

CROSS-REFERENCE TO RELATED APPLICATION

This application is a continuation of International Application No. PCT/JP2015/069969, filed on Jul. 10, 2015 and designating the U.S., the entire contents of which are incorporated herein by reference.

FIELD

The embodiment discussed herein is related to an apparatus authentication system, a management device, and an apparatus authentication method.

BACKGROUND

In recent years, studies have been actively conducted on the technology that is called the Internet of things (IoT) and that performs management control by connecting objects, such as home appliances, or the like, to the Internet. As a specific example, it is conceivable that a sensor measures electrical power consumed by the home appliances and automatically sends the measurement result to a predetermined server device or the like via the Internet and then the electrical power consumed in home is monitored. Such a mechanism of managing the electrical power consumed in home is sometimes called Home Energy Management System (HEMS).

In the products associated with IoT, usually, sensors, communication modules, or the like are previously embedded. In contrast, in order to use IoT in existing products, it is conceivable to externally attach small-size devices provided with sensors, communication modules, or the like to the existing products. In a description below, the product associated with IoT and an external small-size device are not distinguished and are simply referred to as an "IoT terminal device".

If the IoT terminal device is connected to the Internet, the IoT terminal device sometimes performs a wireless connection to, for example, a gateway device (hereinafter, simply referred to as a "GW device"), such as an access point of a wireless local area network (LAN), or the like, and connects to a predetermined server device or the like via the GW device. In such a case, if the IoT terminal device starts a connection to the Internet, an authentication process using, for example, a password, or the like is usually performed such that the wireless connection can be performed between the IoT terminal device and the GW device.
Patent Document 1: Japanese Laid-open Patent Publication No. 2014-123228
Patent Document 2: Japanese Laid-open Patent Publication No. 2009-3501
Patent Document 3: Japanese Laid-open Patent Publication No. 2005-39787

However, unlike, for example, an information processing device, such as a personal computer, a smart phone, or the like, the IoT terminal device does not sufficiently have an input/output function, such as a display, a plurality of operation keys, or the like. In particular, regarding the small-size device that is externally attached to an existing product, only the minimum input/output function tends to be mounted in order to downsize the device as much as possible. Consequently, the authentication process in which a user manually inputs a password or the like is not suitable for many IoT terminal devices. Accordingly, when the IoT terminal device performs a wireless connection to the GW device, it is preferable that the authentication process be performed by a simple operation without the need of inputting to the IoT terminal device or the like.

Thus, for example, as in Wi-Fi Protected Setup (WPS) in a wireless LAN, it is conceivable that, when a predetermine button provided in each device is pressed, connection limitation to the GW device is temporarily released and the connection setting between the IoT terminal device and the GW device is performed during this period. However, because the connection limitation to the GW device is released albeit temporarily, if the same connection setting as WPS is performed, security is decreased. Furthermore, use vulnerability is found in specifications of WPS.

As described above, there is a problem in that, when the IoT terminal device is installed so as to allow for a wireless connection to the GW device, it is difficult to ensure sufficient security with a simple operation.

SUMMARY

According to an aspect of an embodiment, an apparatus authentication system includes a first communication device and a second communication device that are capable of performing wireless communication with each other, and a management device that manages an operation of the first communication device. The management device includes a first counter that counts a first number of times authentication of the first communication device has been successful, a first generating unit that generates a password used for authentication of the first communication device based on the first number of times counted by the first counter, and a first sending unit that sends, to the second communication device, a registration request that requests registration of the password generated by the first generating unit. The first communication device includes a second counter that counts a second number of times authentication of the first communication device has been successful, a second generating unit that generates a password used for authentication of the first communication device based on the second number of times counted by the second counter, and a second sending unit that sends, to the second communication device, a connection request that includes the password generated by the second generating unit and that requests a connection to the second communication device. The second communication device includes a receiving unit that receives the registration request sent by the first sending unit and the connection request sent by the second sending unit, and a determination unit that compares the password registered in accordance with the registration request with the password included in the connection request and that determines whether authentication of the first communication device is successful.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a diagram illustrating a specific example of a counter value DB;

FIG. 4 is a diagram illustrating a specific example of a master key DB;

FIG. 10 is a diagram illustrating a specific example of a password management DB;

FIG. 12 is a sequence diagram illustrating an operation of the apparatus authentication system according to the embodiment.

DESCRIPTION OF EMBODIMENTS

Preferred embodiments of the present invention will be explained with reference to accompanying drawings. Furthermore, the present invention is not limited to the embodiments.

Figure 1:
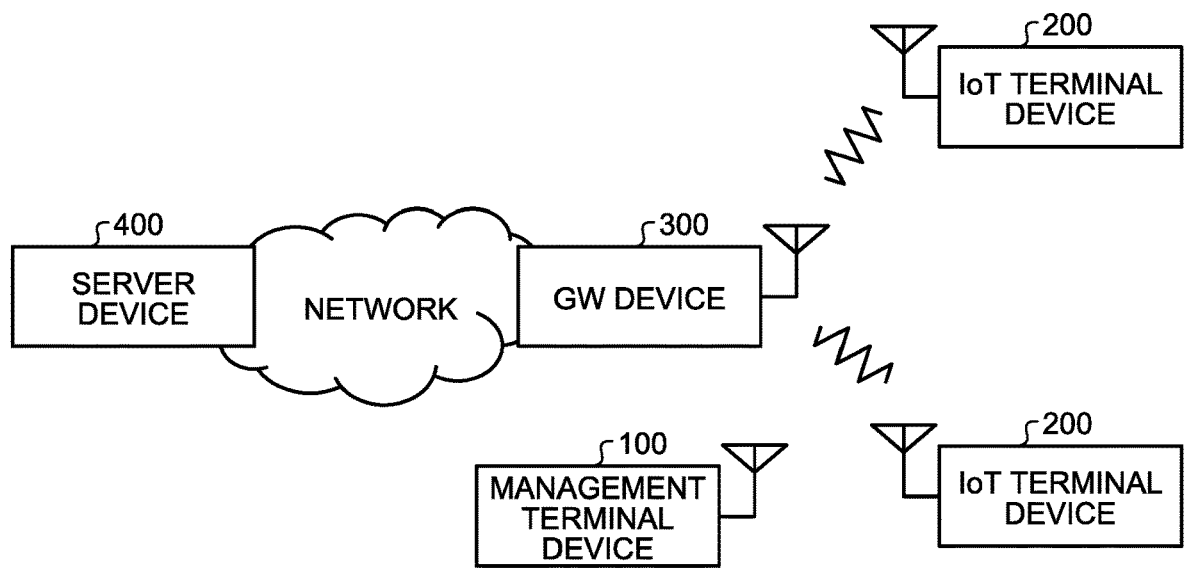
FIG. 1 is a diagram illustrating the configuration of an apparatus authentication system according to an embodiment.

FIG. 1 is a diagram illustrating the configuration of the apparatus authentication system according to an embodiment. The apparatus authentication system illustrated in FIG. 1 includes a management terminal device 100, IoT terminal devices 200, a GW device 300, and a server device 400. This apparatus authentication system is an apparatus authentication system that authenticates wireless connections performed by the IoT terminal devices 200 to the GW device 300 when the IoT terminal devices 200 are installed.

The management terminal device 100 is, for example, an information processing device, such as a smart phone, a personal computer, or the like and includes various input/output units and communication units. Then, regarding each of the IoT terminal devices 200, the management terminal device 100 generates a password based on the number of times authentication of a wireless connection was successful in the past and registers the generated password in the GW device 300.

The IoT terminal device 200 includes, for example, a sensor and a communication module and wirelessly sends the measurement result measured by the sensor from the communication module to the GW device 300. The IoT terminal devices 200 may also be small-size devices that are externally attached to, for example, existing home appliances, or the like, or may also be the home appliances themselves in each of which a sensor or a communication module is previously embedded. When the IoT terminal device 200 requests authentication of a wireless connection to the GW device 300, the IoT terminal device 200 generates a password based on the number of times authentication of a wireless connection was successful in the past and sends the generated password to the GW device 300.

The GW device 300 performs a wireless communication with the authenticated IoT terminal device 200; receives, for example, the measurement result obtained by the sensor from the IoT terminal device 200; and sends the measurement result to the server device 400 via the network. Furthermore, when authenticating the IoT terminal device 200, the GW device 300 determines whether the password registered by the management terminal device 100 matches the password sent from the IoT terminal device 200.

The server device 400 acquires the measurement result obtained by the sensor in each of the IoT terminal devices 200 from the GW device 300 and performs processes in accordance with various applications. Specifically, the server device 400 acquires, for example, electrical power consumption of the home appliances measured by the sensor in each of the IoT terminal devices 200 and accumulates the electrical power consumption of the home appliances for each home. Furthermore, the server device 400 sends, to the IoT terminal device 200 via the GW device 300, an instruction to switch on/off of the power supply of, for example, each of the home appliances.

Figure 2:
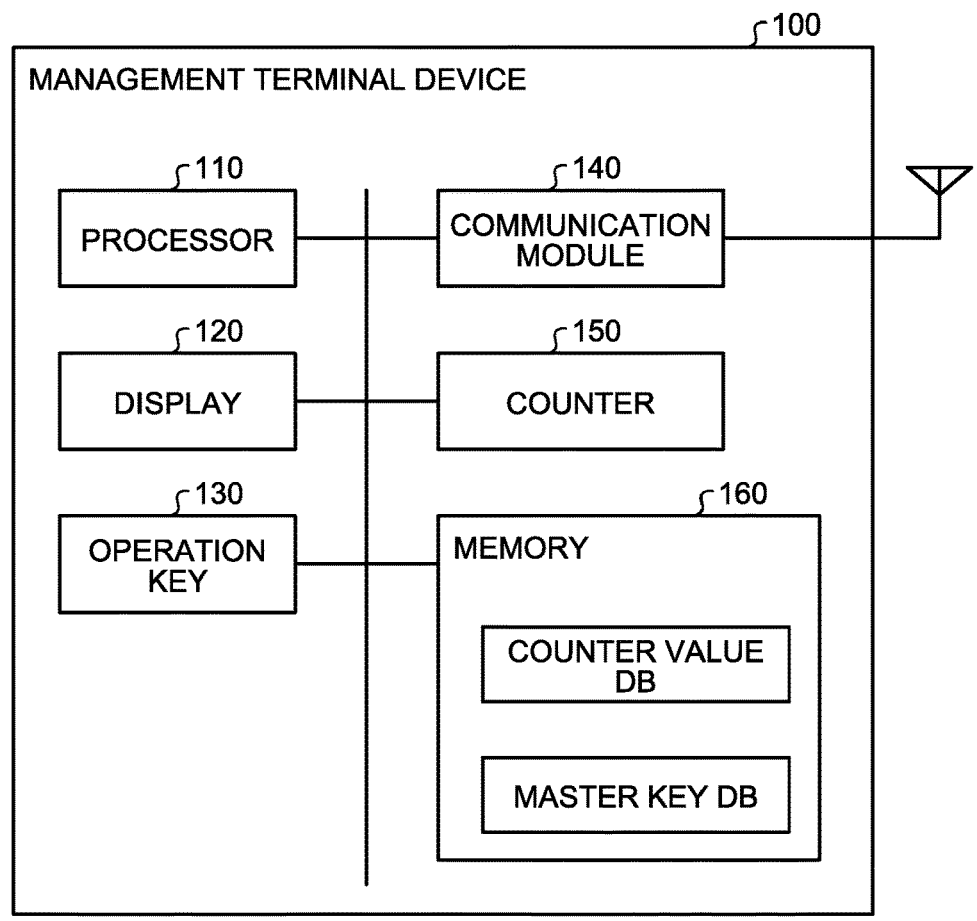
FIG. 2 is a block diagram illustrating the configuration of a management terminal device according to the embodiment.

FIG. 2 is a block diagram illustrating the configuration of the management terminal device 100 according to the embodiment. The management terminal device 100 illustrated in FIG. 2 includes a processor 110, a display 120, an operation key 130, a communication module 140, a counter 150, and a memory 160.

The processor 110 includes, for example, a central processing unit (CPU), a field programmable gate array (FPGA) or a digital signal processor (DSP), and controls each of the units in the management terminal device 100 by using the memory 160. In particular, when a connection of the IoT terminal device 200 and the GW device 300 is started, the processor 110 generates a password used for authentication of the IoT terminal device 200. Then, the processor 110 sends a registration request including the generated password to the GW device 300 via the communication module 140. The function of the processor 110 will be described in detail later.

The display 120 is, for example, an output device, such as a liquid crystal display, or the like and displays an image that is generated as the result of the process in the processor 110.

The operation key 130 is, for example, an input device, such as a keyboard, or the like and receives various operations performed by a user.

The communication module 140 establishes a wireless connection to the GW device 300 by using, for example a wireless LAN, or the like and performs a wireless communication with the GW device 300 via the antenna. Specifically, the communication module 140 sends a registration request including a password used for authentication of the IoT terminal device 200 to the GW device 300. Furthermore, the communication module 140 receives, from the GW device 300, a connection completion notification indicating that authentication of the IoT terminal device 200 was successful and the connection to the GW device 300 has been completed.

The counter 150 counts the number of times each of the IoT terminal devices 200 was successful in authentication. Specifically, when the registration request of the IoT terminal device 200 is sent from the communication module 140, the counter 150 reads a counter value related to the subject IoT terminal device 200 from the memory 160 and sets the counter value. Then, if the connection completion notification indicating that the authentication of the IoT terminal device 200 was successful is received by the communication module 140, the counter 150 increments the counter value by one. Thus, the counter 150 counts, for each of the IoT terminal devices 200, the number of times authentication was successful regardless whether the counterpart of the communication with the IoT terminal device 200 is the GW device 300.

The memory 160 includes, for example, a random access memory (RAM), a read only memory (ROM), or the like and stores therein various kinds of information used by the processor 110. Specifically, the memory 160 stores therein a counter value database (hereinafter, simply referred to as a "counter value DB") and a master key database (hereinafter, simply referred to as a "master key DB").

The counter value DB stores therein, as illustrated in, for example, FIG. 3, the counter values each indicating the number of times authentication was successful in the past by associating the counter values with the IoT terminal IDs that correspond to identification information on the respective IoT terminal devices 200. Namely, it is found that, in the example illustrated in FIG. 3, for example, the IoT terminal device 200 with the IoT terminal ID of "00-00-0E-11-22-33" was successful in authentication once in the past. Furthermore, for example, a media access control (MAC) address unique to each of the IoT terminal devices 200 or the like can be used as the IoT terminal ID. Furthermore, the counter value DB may also be configured such that, for example, when a user inputs information related to the new IoT terminal device 200, the entry for the subject IoT terminal device 200 is added. Namely, the IoT terminal ID of the newly installed IoT terminal device 200 and the initial value 0 of the counter value may also be stored in the counter value DB in the memory 160.

The master key DB stores therein, for example, as illustrated in FIG. 4, the master keys corresponding to the basic information on the generation of a password by associating the master keys with the IoT terminal IDs unique to the respective IoT terminal devices 200. Namely, it is found that, in the example illustrated in FIG. 4, for example, the password of the IoT terminal device 200 with the IoT terminal ID of "00-00-0E-11-22-33" is generated by the master key "45fcaa8d23 . . . ". Furthermore, similarly to the counter value DB described above, for example, the MAC addresses unique to the respective IoT terminal devices 200 or the like may also be used as the IoT terminal IDs. Furthermore, in the master key DB may also be configured such that, for example, when a user inputs information related to the new IoT terminal device 200, the entry for the subject IoT terminal device 200 is added. Namely, the IoT terminal ID and the master key of the newly installed IoT terminal device 200 may also be stored in the master key DB in the memory 160.

Figure 5:
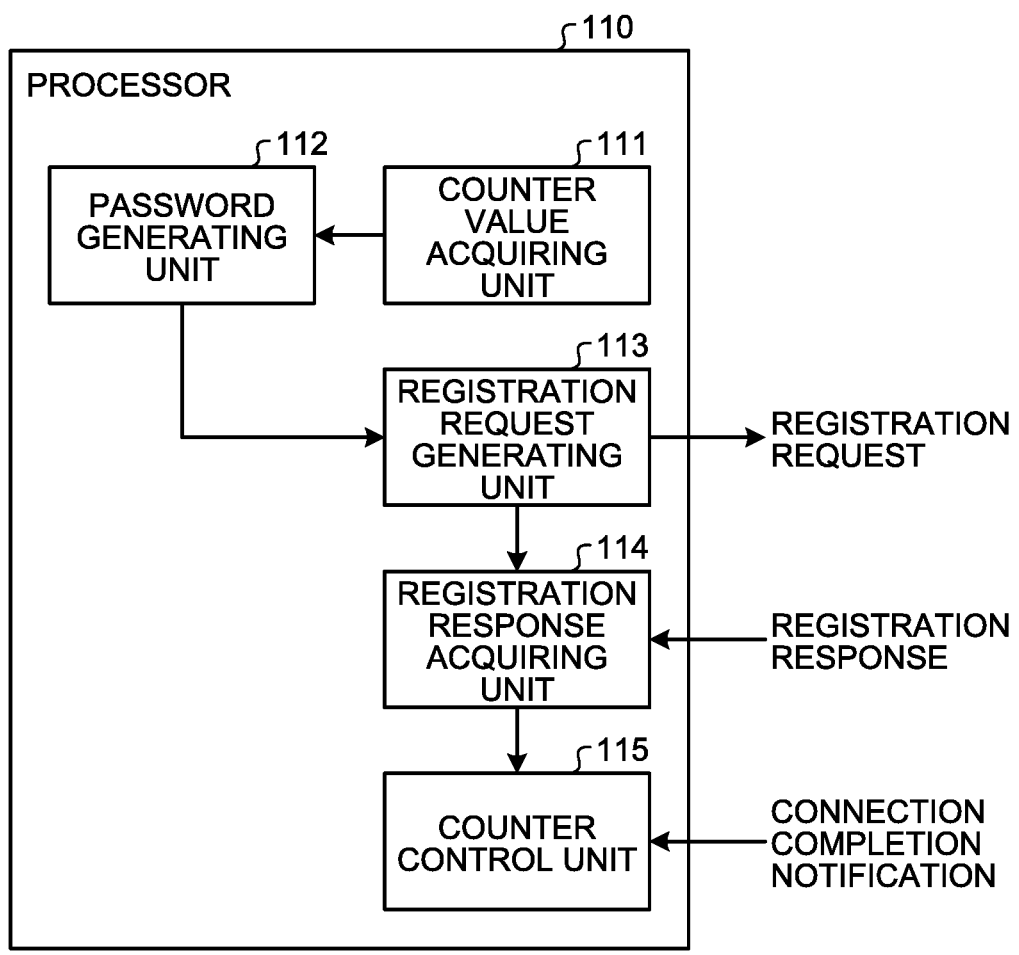
FIG. 5 is a block diagram illustrating the function of a processor in the management terminal device.

FIG. 5 is a block diagram illustrating the function of the processor 110 in the management terminal device 100. The processor 110 illustrated in FIG. 5 includes a counter value acquiring unit 111, a password generating unit 112, a registration request generating unit 113, a registration response acquiring unit 114, and a counter control unit 115.

The counter value acquiring unit 111 acquires, when a registration instruction of the IoT terminal device 200 is accepted due to an operation of the operation key 130 performed by a user, the counter value related to the subject IoT terminal device 200 from the memory 160. Namely, the counter value acquiring unit 111 acquires, from the counter value DB, the counter value that is stored in association with the IoT terminal ID of the IoT terminal device 200 that is to be authenticated. Then, the counter value acquiring unit 111 outputs the acquired counter value to the password generating unit 112 together with the IoT terminal ID. Furthermore, the counter value acquiring unit 111 sets the acquired counter value to the counter 150.

The password generating unit 112 acquires, from the memory 160, the master key associated with the IoT terminal ID that is output from the counter value acquiring unit 111. Namely, the password generating unit 112 acquires, from the master key DB, the master key associated with the IoT terminal ID of the IoT terminal device 200 that is to be authenticated. Then, the password generating unit 112 generates a password based on the acquired master key and the counter value that has been output from the counter value acquiring unit 111. Namely, the password generating unit 112 generates a password that varies in accordance with the number of times authentication of the IoT terminal device 200 was successful in the past. For example, the password generating unit 112 generates a password by generating a hash function in accordance with the counter value conforming to a predetermined rule and by hashing the master key by using the generated hash function.

The registration request generating unit 113 generates a registration request that requests the GW device 300 to register the password generated by the password generating unit 112. At this time, in addition to the IoT terminal ID and the password, the registration request generating unit 113 may also generate a registration request including management information, such as the MAC address, the name of manufacturing vendor, the model name of the IoT terminal device 200, and the like. The registration request generating unit 113 sends the generated registration request to the GW device 300 via the communication module 140.

The registration response acquiring unit 114 acquires a registration response that is sent from the GW device 300 and that is received by the communication module 140. Namely, the registration response acquiring unit 114 waits to receive the registration response after the registration request has been sent and then acquires, from the communication module 140, the registration response indicating whether both the IoT terminal ID and the password have normally been registered in the GW device 300.

The counter control unit 115 detects a connection completion notification that is sent from the GW device 300 and that is received by the communication module 140. Namely, if the registration response indicating that both the IoT terminal ID and the password have normally been registered by the GW device 300 is received, the counter control unit 115 waits to receive the connection completion notification indicating that the connection between the IoT terminal device 200 and the GW device 300 has been completed. Then, if the counter control unit 115 detects that the connection completion notification has been received by the communication module 140, the counter control unit 115 increments the counter value of the counter 150 by one. Then, the counter control unit 115 stores, in the memory 160, the incremented counter value of the counter 150. Namely, the counter control unit 115 increments the counter value related to the IoT terminal device 200 that was successful in authentication by one and stores the incremented value in the counter value DB.

Figure 6:
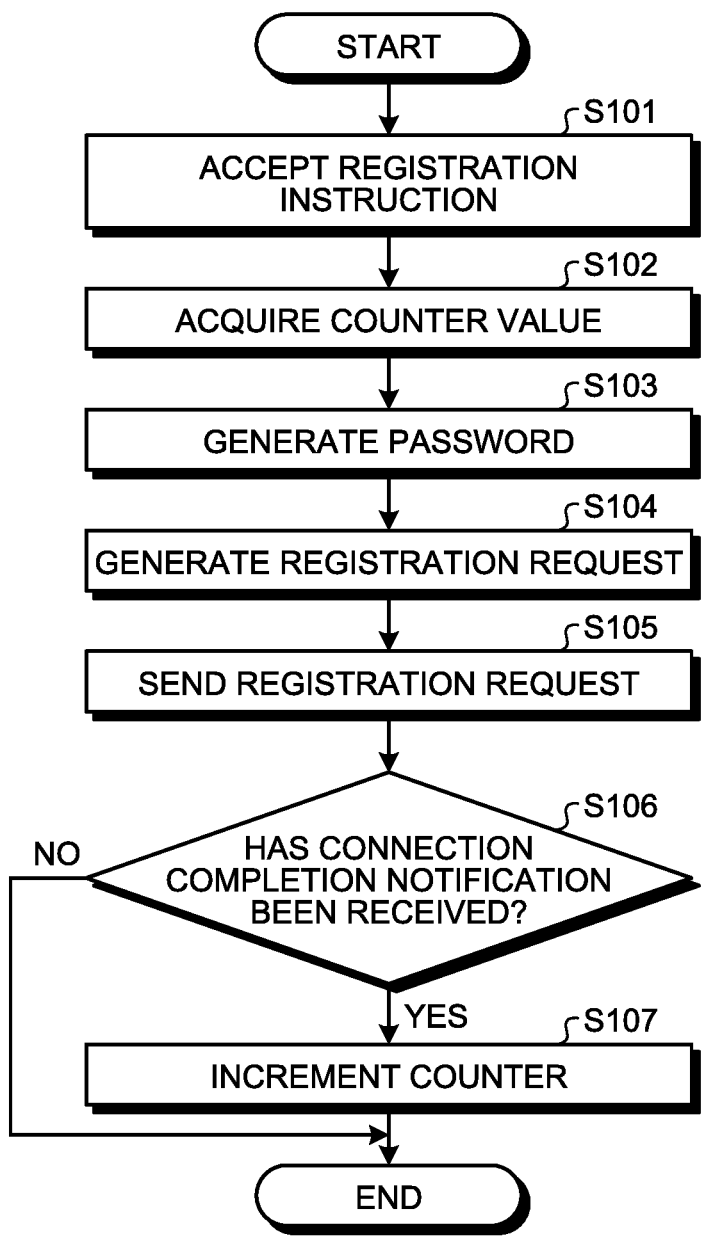
FIG. 6 is a flowchart illustrating a password registration process according to the embodiment.

In the following, a password registration process performed by the management terminal device 100 having the configuration described above will be described with reference to the flowchart illustrated in FIG. 6. In below, a description will be given on the assumption that the counter value and the master key related to the IoT terminal device 200 that is to be authenticated have already been stored in the counter value DB and the master key DB, respectively. The counter value and the master key may also be stored in the counter value DB and the master key DB, respectively, in accordance with an input performed by a user when the new IoT terminal device 200 is installed. At this time, the user can input the IoT terminal ID or the master key of the IoT terminal device 200 by using, for example, the operation key 130 or an input device, such as a camera (not illustrated), or the like.

The user who desires a connection between the IoT terminal device 200 and the GW device 300 operates the operation key 130 in the management terminal device 100 and performs an operation to instruct the registration of the password of the target IoT terminal device 200. This operation includes, for example, similarly to the operation to input the IoT terminal ID, an operation to input the information for identifying the IoT terminal device 200 that is to be authenticated. If this operation is accepted by the operation key 130, the registration instruction is accepted by the processor 110 (Step S101). Then, the counter value DB in the memory 160 is referred to by the counter value acquiring unit 111 in the processor 110 and the counter value associated with the IoT terminal device 200 that is to be authenticated is acquired (Step S102). Namely, the counter value stored in association with the IoT terminal ID of the IoT terminal device 200 that is to be authenticated is acquired.

The acquired counter value is set in the counter 150 and is output to the password generating unit 112. Then, a password in accordance with the counter value is generated by the password generating unit 112 (Step S103). Specifically, the master key that is stored in association with the IoT terminal ID of the IoT terminal device 200 that is to be authenticated is acquired from the master key DB by the password generating unit 112 and a password is generated by converting the master key by using the counter value. Consequently, the password generated by the password generating unit 112 varies every time the counter value is changed.

The generated password is output to the registration request generating unit 113. Then, the registration request including both the IoT terminal ID of the IoT terminal device 200 that is to be authenticated and the generated password is generated by the registration request generating unit 113 (Step S104). This registration request may also include, for example, the management information, such as the MAC address, the name of manufacturing vendor, the model name of the IoT terminal device 200.

The generated registration request is sent from the communication module 140 to the GW device 300 via the antenna (Step S105). The GW device 300 that receives the registration request registers the IoT terminal ID and the password that are included in the registration request and sends, if normal registration has been performed, the registration response indicating this state to the management terminal device 100. Furthermore, if normal registration of the password has not been performed, the GW device 300 sends the registration response indicating this state to the management terminal device 100. The registration response is acquired by the registration response acquiring unit 114 via the communication module 140 in the management terminal device 100. Then, if the registration response indicating that normal registration of the password has been performed is acquired, reception of the connection completion notification is waited by the counter control unit 115 (Step S106).

At this time, in the GW device 300 in which the password has normally been registered, a connection request including the password is received from the IoT terminal device 200 that is to be authenticated. Then, if the password included in the connection request matches the registered password, the GW device 300 permits the wireless connection to the IoT terminal device 200. Namely, if the password registered by the management terminal device 100 matches the password sent from the IoT terminal device 200, authentication of the IoT terminal device 200 is successful. In this case, the GW device 300 sends, to the management terminal device 100, the connection completion notification indicating that authentication of the IoT terminal device 200 was successful and the connection between the IoT terminal device 200 and the GW device 300 has been completed.

Accordingly, if the password registered by the management terminal device 100 does not match the password sent from the IoT terminal device 200, the connection completion notification is not sent and the connection completion notification is not received by the management terminal device 100 (No at Step S106). In this case, the counter 150 in the management terminal device 100 is not incremented and the counter value related to the IoT terminal device 200 is not changed. Consequently, the counter value that is set in the counter 150 at the time of sending the registration request is stored in the counter value DB without being changed.

In contrast, if the connection completion notification has been sent, the connection completion notification is received by the communication module 140 in the management terminal device 100 (Yes at Step S106) and is detected by the counter control unit 115. Then, by the counter 150 being controlled by the counter control unit 115, the counter value is incremented by one (Step S107). Consequently, the counter value that is greater than the counter value that was set in the counter 150 at the time of sending the registration request by one is stored in the counter value DB.

In this way, the management terminal device 100 generates the password in accordance with the number of times authentication of the IoT terminal device 200 that is to be authenticated was successful and registers the generated password in the GW device 300 before the IoT terminal device 200 sends the connection request to the GW device 300. Then, if authentication of the IoT terminal device 200 was successful based on the registered password, the management terminal device 100 increments the number of times authentication of the IoT terminal device 200 was successful by one. Consequently, the important information, such as the master key of the IoT terminal device 200, is not stored in the GW device 300 and leakage of the master key or the like can be prevented, thus security can be improved. Furthermore, it is possible to perform an authentication process with respect to the IoT terminal device 200 by using a temporary password that varies in accordance with the number of times authentication was successful and it is possible to ensure sufficient security with a simple operation.

Figure 7:
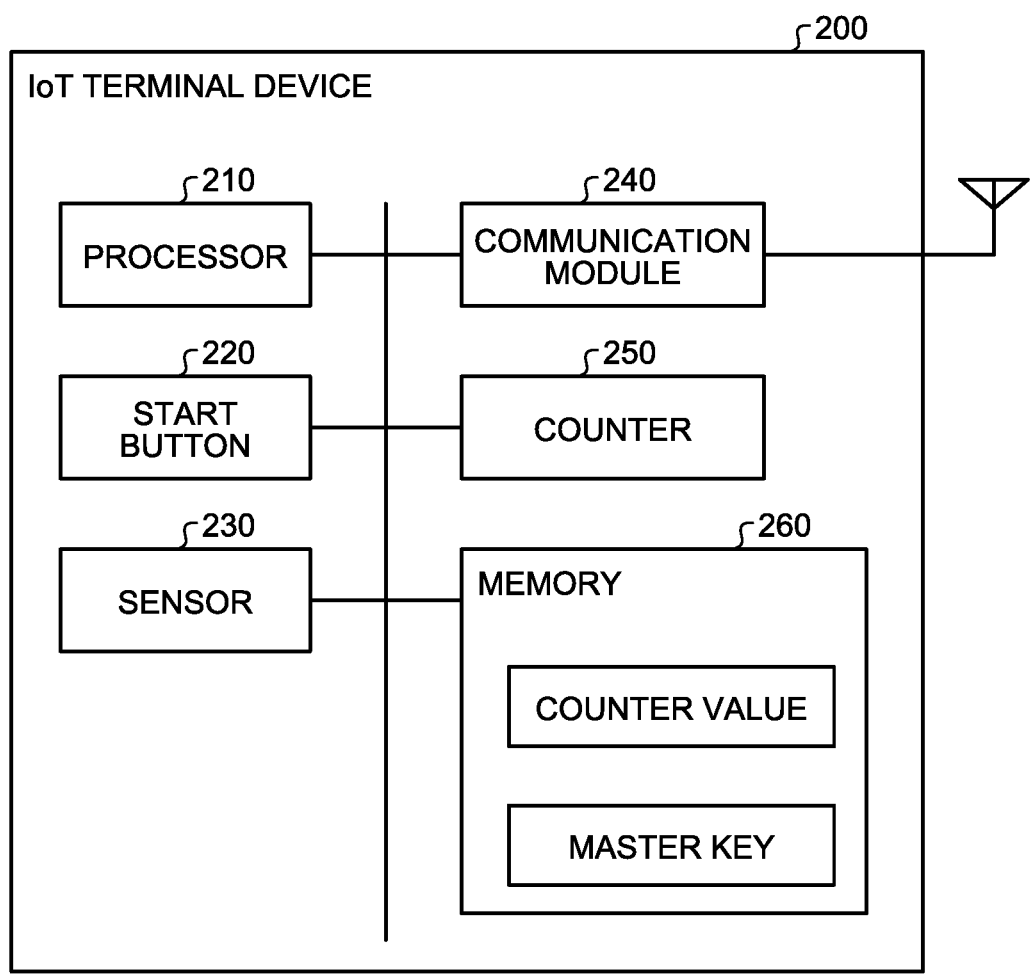
FIG. 7 is a block diagram illustrating the configuration of an IoT terminal device according to the embodiment.

In the following, the configuration of the IoT terminal device 200 and the GW device 300 according to the embodiment will be described. FIG. 7 is a block diagram illustrating the configuration of the IoT terminal device 200 according to the embodiment. The IoT terminal device 200 illustrated in FIG. 7 includes a processor 210, a start button 220, a sensor 230, a communication module 240, a counter 250, and a memory 260.

The processor 210 includes, for example, a CPU, an FPGA, or a DSP and controls each of the units in the IoT terminal device 200 by using the memory 260. In particular, if the start button 220 is pressed, the processor 210 generates a password used for authentication of the IoT terminal device 200. Then, the processor 210 sends the connection request including the generated password to the GW device 300 via the communication module 240. The function of the processor 210 will be described in detail later.

The start button 220 is a button that can be pressed by a user and, if the start button 220 is pressed, the authentication process with respect to the IoT terminal device 200 is started. Unlike the keyboard provided with a plurality of keys, the start button 220 is a single button; therefore, the effect of an increase in the size of circuit due to the start button 220 provided in the IoT terminal device 200 is negligibly small.

The sensor 230 is an electrical power sensor that measures, for example, electrical power consumption and that measures electrical power consumed by a home appliance on which the IoT terminal device 200 is mounted. The measurement result obtained by the sensor 230 is sent to the server device 400 via the GW device 300 after the IoT terminal device 200 was authenticated by the GW device 300.

The communication module 240 establishes a wireless connection with the GW device 300 by using, for example, near field wireless communication, such as Bluetooth (registered trademark), ZigBee (registered trademark), or the like and performs wireless communication with the GW device 300 via an antenna. Specifically, the communication module 240 sends the connection request including the password used for authentication of the IoT terminal device 200 to the GW device 300. Furthermore, the communication module 240 receives, from the GW device 300, the connection response indicating whether authentication of the IoT terminal device 200 was successful.

The counter 250 counts the number of times the IoT terminal device 200 was successful in authentication. Specifically, if the connection response indicating that authentication of the IoT terminal device 200 was successful is received by the communication module 240, the counter 250 increments the counter value by one. Here, the counter 250 counts the number of times authentication was successful regardless whether the counterpart of communication with the IoT terminal device 200 is the GW device 300.

The memory 260 includes, for example, a RAM, a ROM, or the like and stores therein various kinds of information used by the processor 210. Specifically, the memory 260 stores therein the counter values in the counter 250 and the master keys unique to the IoT terminal devices 200.

Figure 8:
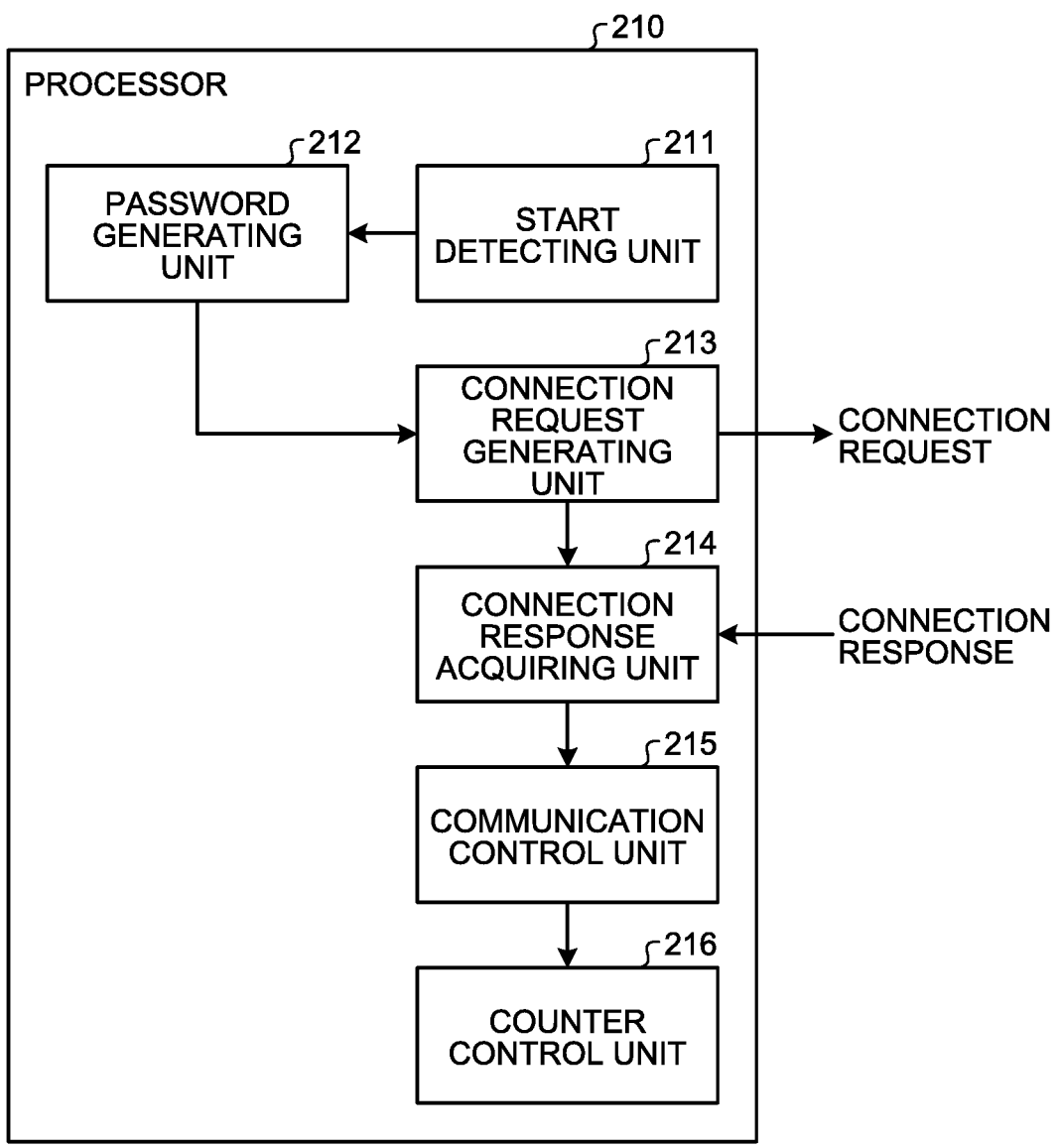
FIG. 8 is a block diagram illustrating the function of a processor in the IoT terminal device.

FIG. 8 is a block diagram illustrating the function of the processor 210 in the IoT terminal device 200. The processor 210 illustrated in FIG. 8 includes a start detecting unit 211, a password generating unit 212, a connection request generating unit 213, a connection response acquiring unit 214, a communication control unit 215, and a counter control unit 216.

The start detecting unit 211 detects a press of the start button 220 and, if the press of the start button 220 is detected, the start detecting unit 211 instructs the password generating unit 212 to start the authentication process with respect to the IoT terminal device 200.

If the start of the authentication process is instructed, the password generating unit 212 acquires the master key and the counter value of the IoT terminal device 200 from the memory 260. Then, the password generating unit 212 generates a password based on the acquired master key and the counter value. Namely, the password generating unit 212 generates a password that varies in accordance with the number of times authentication of the IoT terminal device 200 was successful in the past. For example, the password generating unit 212 generates a password by generating a hash function in accordance with the counter value conforming to the same rule as that of the password generating unit 112 and by hashing the master key by using the generated hash function. If the counter 150 in the management terminal device 100 is synchronized with the counter 250 in the IoT terminal device 200, this password matches the password that is registered in the GW device 300 by the management terminal device 100. Namely, if the number of times authentication of the IoT terminal device 200 was successful is correctly counted by both the management terminal device 100 and the IoT terminal device 200, the management terminal device 100 and the IoT terminal device 200 generate the same password.

The connection request generating unit 213 generates a connection request that includes the password generated by the password generating unit 212 and that requests a connection to the GW device 300. Specifically, the connection request generating unit 213 generates a connection request including both the IoT terminal ID for identifying the IoT terminal device 200 and the password. Then, the connection request generating unit 213 sends the generated connection request to the GW device 300 via the communication module 240.

The connection response acquiring unit 214 acquires the connection response that is sent from the GW device 300 and that is received by the communication module 240. Namely, the connection response acquiring unit 214 waits to receive the connection response after the connection request was sent and acquires, from the communication module 240, the connection response indicating whether authentication of the IoT terminal device 200 was successful.

If authentication of the IoT terminal device 200 was successful, the communication control unit 215 executes the connection setting with the GW device 300 and further executes the connection setting with the server device 400 via the GW device 300. At this time, the communication control unit 215 may also exchange, with the GW device 300, for example, an encryption parameter, or the like, that is used for individually performed communication between each of the IoT terminal devices 200 and the GW device 300. Furthermore, if the connection setting between the GW device 300 and the server device 400 has been completed, the communication control unit 215 controls the communication module 240 and periodically sends, to the server device 400, the electrical power consumption measured by, for example, the sensor 230.

If the connection setting with the GW device 300 has been completed by the communication control unit 215, the counter control unit 216 increments the counter value of the counter 250 by one. Namely, if authentication of the IoT terminal device 200 was successful, the counter control unit 216 increments the counter value in the counter 250 by one and stores the incremented counter value in the memory 260.

Figure 9:
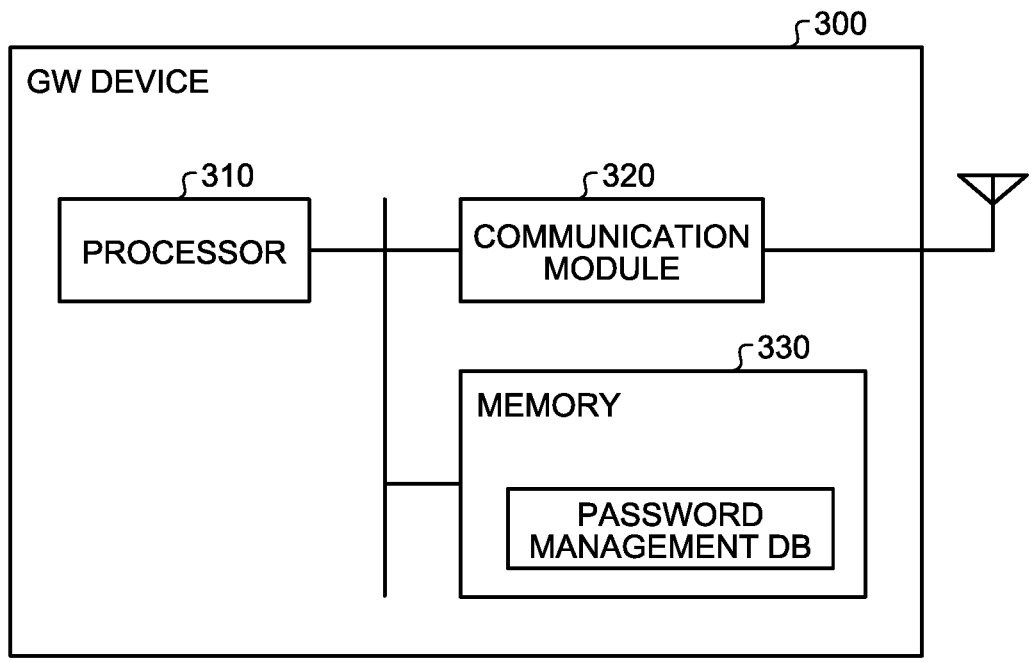
FIG. 9 is a block diagram illustrating the configuration of a GW device according to the embodiment.

FIG. 9 is a block diagram illustrating the configuration of the GW device 300 according to the embodiment. The GW device 300 illustrated in FIG. 9 includes a processor 310, a communication module 320, and a memory 330.

The processor 310 includes, for example, a CPU, an FPGA, a DSP, or the like and controls each of the units in the GW device 300 by using the memory 330. In particular, if the processor 310 accepts the registration request from the management terminal device 100, the processor 310 registers the password included in the registration request and, subsequently, if the processor 310 accepts the connection request from the IoT terminal device 200, the processor 310 compares the registered password with the password included in the connection request. Then, if the two passwords match, the processor 310 permits the connection to the GW device 300 performed by the IoT terminal device 200. The function of the processor 310 will be described in detail later.

The communication module 320 establishes a wireless connection between the management terminal device 100 and the IoT terminal device 200 by using, for example, a wireless LAN and various kinds of near field wireless communication and then performs wireless communication via an antenna. Specifically, the communication module 320 sends and receives the registration request and the registration response to and from the management terminal device 100 and sends and receives the connection request and the connection response to and from the IoT terminal device 200. Furthermore, the communication module 320 sends the connection completion notification to the management terminal device 100.

The memory 330 includes, for example, a RAM, a ROM, or the like and stores therein various kinds of information used by the processor 310. Specifically, the memory 330 holds a password management database (hereinafter, simply referred to as a "password management DB").

The password management DB stores therein, for example, as illustrated in FIG. 10, in association with the IoT terminal ID unique to each of the IoT terminal devices 200, the password registered based on the registration request from the management terminal device 100, the date and time on which this password was registered, and the expiration date of this password. Furthermore, the password management DB may also stores therein, as illustrated in FIG. 10, internal IDs that are used by the GW device 300 to internally identify the IoT terminal devices 200 located in the area where communication is possible.

In the example illustrated in FIG. 10, it is found that, for example, the password of the IoT terminal device 200 with the IoT terminal ID of "00-00-0E-11-22-33" is "9ea0e60f47 . . . " and is registered at 10:24 on May 5, 2015. Furthermore, it is found that the expiration date of this password is May 4, 2016 that is one year after the registered date and time. In contrast, it is found that, for example, the password of the IoT terminal device 200 with the IoT terminal ID of "00-00-0E-11-24-24" is a blank field and thus the password was deleted for some reason that, for example, the expiration date has passed, or the like.

Furthermore, although not illustrated in FIG. 10, the password management DB may also store, in association with the IoT terminal ID, the management information, such as the name of manufacturing vendor, the model name of the IoT terminal device 200, or the like, included in the registration request. Furthermore, the password management DB may also store, in association with the IoT terminal ID, the identification information on the management terminal device 100 that is the sending source of the registration request. Furthermore, if the expiration date of the password is stored in the password management DB, the processor 310 may also manage the expiration date of each of the passwords and delete a password that is past its expiration date from the password management DB. In this case, the IoT terminal ID and the management information other than the password may be remained without being deleted. By doing so, at the time of next registration request and after that, the management information does not need to be updated in the password management DB.

Figure 11:
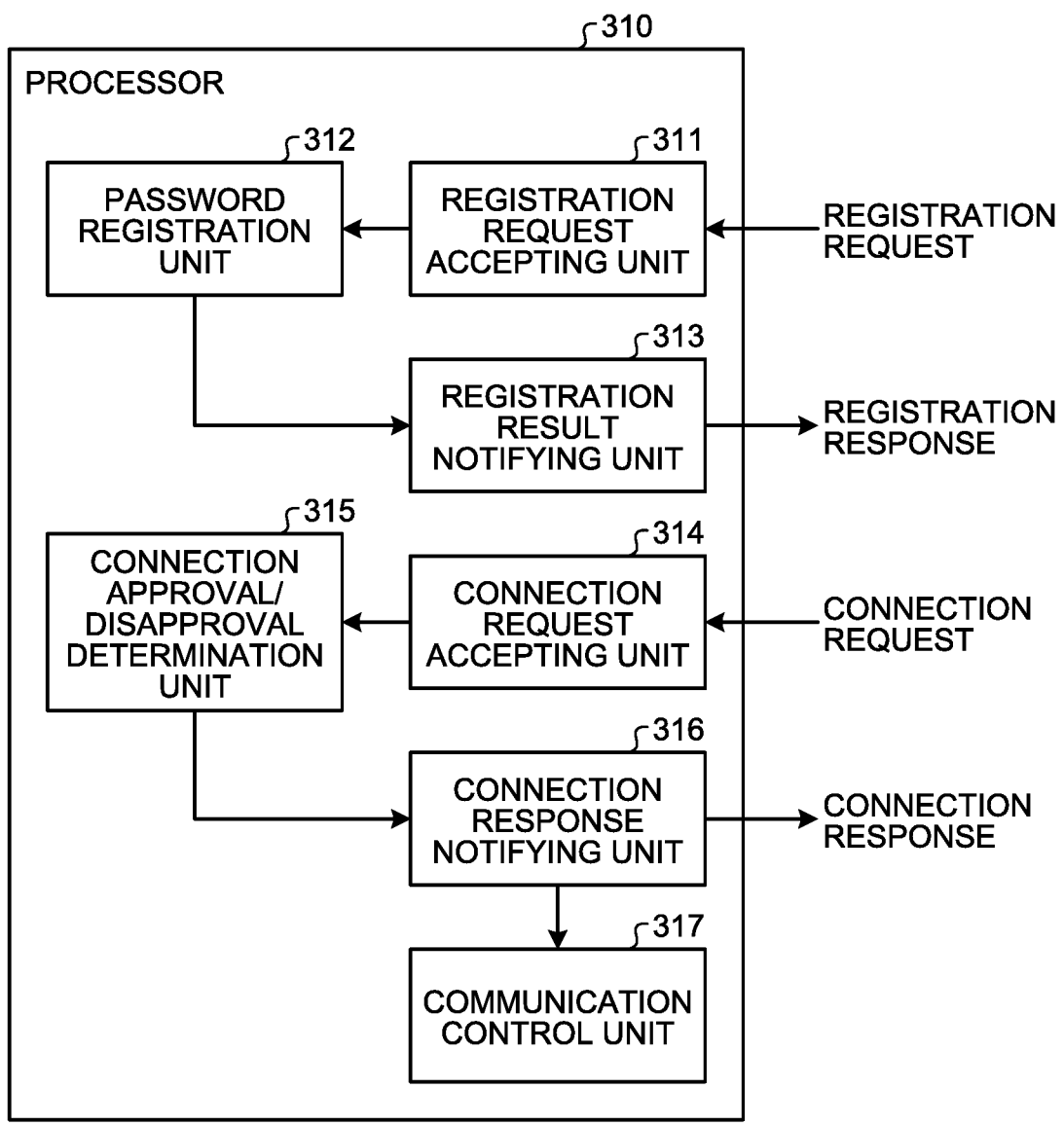
FIG. 11 is a block diagram illustrating the function of a processor in the GW device.

FIG. 11 is a block diagram illustrating the function of the processor 310 in the GW device 300. The processor 310 illustrated in FIG. 11 includes a registration request accepting unit 311, a password registration unit 312, a registration result notifying unit 313, a connection request accepting unit 314, a connection approval/disapproval determination unit 315, a connection response notifying unit 316, and a communication control unit 317.

The registration request accepting unit 311 accepts the registration request that is sent from the management terminal device 100 and that is received by the communication module 320 and then outputs, to the password registration unit 312, the IoT terminal ID and the password of the IoT terminal device 200 that are included in the registration request.

The password registration unit 312 registers the IoT terminal ID and the password that are output from the registration request accepting unit 311 in the password management DB in the memory 330. At this time, the password registration unit 312 may also register, in the password management DB, the management information, such as the name of manufacturing vendor, the model name of the IoT terminal device 200, or the like, that is included in the registration request.

The registration result notifying unit 313 generates a registration response indicating whether the password of the IoT terminal device 200 is normally registered by the password registration unit 312 and then sends the generated registration response to the management terminal device 100 via the communication module 320.

The connection request accepting unit 314 accepts the connection request that is sent from the IoT terminal device 200 and that is received by the communication module 320 and then outputs, to the connection approval/disapproval determination unit 315, the IoT terminal ID and the password of the IoT terminal device 200 included in the connection request.

By determining whether the password output from the connection request accepting unit 314 matches the password registered in the password management DB, the connection approval/disapproval determination unit 315 determines whether to permit the IoT terminal device 200 to connect to the GW device 300. Namely, the connection approval/disapproval determination unit 315 reads, from the memory 330, the password that is stored in the password management DB in association with the IoT terminal ID and that is output from the connection request accepting unit 314 and then determines whether the read password matches the password included in the connection request. If the determination result indicates that both the passwords match, the connection approval/disapproval determination unit 315 determines to permit the IoT terminal device 200 to connect to the GW device 300. In contrast, if the passwords do not match, the connection approval/disapproval determination unit 315 determines not to permit the IoT terminal device 200 to connect to the GW device 300.

The connection response notifying unit 316 generates a connection response including the determination result obtained in the connection approval/disapproval determination unit 315 and sends the generated connection response to the IoT terminal device 200 that is the sending source of the connection request via the communication module 320.

The communication control unit 317 performs connection setting with the IoT terminal device 200 in which the connection has been permitted and relays the communication between the subject IoT terminal device 200 and the server device 400. Specifically, the communication control unit 317 may also exchange, with the IoT terminal device 200, for example, an encryption parameter that is used for individually performed communication between each of the IoT terminal devices 200 and the GW device 300. Then, by using the encryption parameter, the communication control unit 317 relays, to the server device 400, the information sent from the IoT terminal device 200 or relays, to the IoT terminal device 200, the information sent from the server device 400. Furthermore, if the connection setting with the IoT terminal device 200 has been completed, the communication control unit 317 sends a connection completion notification to the management terminal device 100 via the communication module 320.

In the following, the operation of the apparatus authentication system according to the embodiment will be described with reference to the sequence diagram illustrated in FIG. 12.

First, if a user who desires a connection between the IoT terminal device 200 and the GW device 300 operates the management terminal device 100 and performs a registration instruction of the IoT terminal device 200, this registration instruction is accepted by the processor 110 in the management terminal device 100 (Step S201). Then, the counter value and the master key that are associated with the IoT terminal ID and that are included in the registration instruction are acquired from the memory 160 by the counter value acquiring unit 111 and a password is generated by the password generating unit 112 (Step S202). Namely, because the master key and the counter value are used by the password generating unit 112, a different password in accordance with the number of times authentication of the IoT terminal device 200 was successful in the past is generated.

Then, the registration request including the generated password is sent from the registration request generating unit 113 to the GW device 300 (Step S203). The registration request is accepted by the processor 310 in the GW device 300 and the IoT terminal ID and the password included in the registration request are registered in the password management DB in the memory 330 by the password registration unit 312 (Step S204). At this time, the management information included in the registration request may also simultaneously be registered in the password management DB. If the registration into the password management DB has been completed, the registration response indicating whether the password has normally been registered is sent from the registration result notifying unit 313 to the management terminal device 100 (Step S205).

If this registration response indicates that the password has normally been registered, the registration process of the password performed by the management terminal device 100 is completed. In contrast, if the registration response indicates that the password has not normally been registered, the management terminal device 100 may also again send the registration request including the same password to the GW device 300. If the registration request is resent in this way, the registration request may also be resent by using the password that has already been generated by the password generating unit 112 and is temporarily stored or may also be resent by using the password newly generated by the password generating unit 112. In the following, a description will be given on the assumption that the registration response indicating that the password has normally been registered is received by the management terminal device 100 and the registration process of the password has been completed.

The user who has checked that the registration process of the password has been completed in the management terminal device 100 presses the start button 220 in the IoT terminal device 200 that is to be authenticated. If the press of the start button 220 is detected by the start detecting unit 211 in the processor 210 (Step S206), a password is generated by the password generating unit 212 (Step S207). Namely, because the master key and the counter value are used by the password generating unit 212, a different password is generated in accordance with the number of times authentication of the IoT terminal device 200 was successful in the past. This password is different in accordance with the number of times authentication of the IoT terminal device 200 was successful; however, if both the management terminal device 100 and the IoT terminal device 200 correctly count the number of times authentication was successful in the past, in the registration process described above, the password matches the password registered in the GW device 300.

Then, the connection request including the generated password is sent from the connection request generating unit 213 to the GW device 300 (Step S208). The connection request is accepted by the processor 310 in the GW device 300 and it is determined, by the connection approval/disapproval determination unit 315, whether the password included in the connection request matches the password that has already been registered in the password management DB. In other words, it is determined, by the connection approval/disapproval determination unit 315, whether a connection desired by the IoT terminal device 200 to the GW device 300 is permitted (Step S209). The determination performed here is a determination to permit the connection if the passwords match and a determination not to permit the connection if the passwords do not match.

The determination result obtained by the connection approval/disapproval determination unit 315 is reported, as a notification, to the IoT terminal device 200 by using the connection response that is sent from the connection response notifying unit 316 to the IoT terminal device 200 (Step S210). Then, if the connection is permitted, the connection setting is performed between the communication control unit 215 in the IoT terminal device 200 and the communication control unit 317 in the GW device 300 and, for example, the encryption parameter used for individually performed communication is exchanged (Step S211). If authentication of the IoT terminal device 200 is successful in this way, in the IoT terminal device 200, the counter 250 is controlled by the counter control unit 216, whereby the counter value is incremented by one (Step S212). Namely, because the number of times authentication of the IoT terminal device 200 is increased by one, at the time of subsequent connection request, a password that is different from that used for the connection request this time is to be generated.

In contrast, in the GW device 300 in which the connection setting with the IoT terminal device 200 was performed, a connection completion notification indicating the completion of the connection to the IoT terminal device 200 is sent to the management terminal device 100 by the communication control unit 317 (Step S213). Then, if the connection completion notification is received by the management terminal device 100, reception of the connection completion notification is detected by the counter control unit 115 and then the counter value of the counter 150 is incremented by one (Step S214). Namely, because the number of times authentication of the IoT terminal device 200 was successful is increased by one, at the time of subsequent registration request related to the subject IoT terminal device 200, a password that is different from that used for the registration request this time it to be generated. However, because the counter values of the management terminal device 100 and the IoT terminal device 200 are synchronized, the passwords each generated by the management terminal device 100 and the IoT terminal device 200 also match even when the IoT terminal device 200 is authenticated next time.

As described above, according to the embodiment, the management terminal device 100 and the IoT terminal device 200 each includes the counter that counts the number of times authentication of the IoT terminal device 200 was successful and, if the IoT terminal device 200 is to be authenticated, the management terminal device 100 generates a password based on the counter value. Then, after the management terminal device 100 has registered the password in the GW device 300, the IoT terminal device 200 generates a password based on the counter value and sends a connection request to the GW device 300. The GW device 300 that has received the connection request determines whether the password included in the connection request matches the password registered in the management terminal device 100 and, if both match, the GW device 300 permits a connection performed by the IoT terminal device 200. Consequently, authentication of the IoT terminal device 200 can be performed by the password that varies in accordance with the counter value without the need for an input to the IoT terminal device 200 and it is possible to ensure sufficient security with a simple operation.

Furthermore, in the embodiment described above, the process in which the management terminal device 100 registers a password in the GW device 300 may also be performed by, for example, an application for managing the IoT terminal device 200 or may also be performed by a generally used Web service.

Furthermore, in the embodiment described above, the IoT terminal device 200 includes the start button 220; however, the button that can be pressed does not need to be used and the starting of the connection request may also be detected by, for example, a selector switch, such as a DIP switch, or the like. Furthermore, the IoT terminal device 200 does not need to include the physical start button 220 or the selector switch and the connection request may also automatically be started, for example, at the time of startup or after a predetermined time has elapsed since the startup.

According to an aspect of an embodiment of the apparatus authentication system, the management device, and the apparatus authentication method disclosed in the present invention, an advantage is provided in that it is possible to ensure sufficient security with a simple operation.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An apparatus authentication system comprising:
a first communication device and a second communication device to perform wireless communication with each other; and
a management device that manages an operation of the first communication device, wherein the management device includes:
a first memory and a first processor coupled to the first memory, the first memory storing therein a first number of times authentication of the first communication device has been successful, the first number of times being counted in the management device, the first processor executing:
first generating a password used for authentication of the first communication device based on the first number of times, and
sending, to the second communication device, a registration request that requests registration of the first generated password,
the first communication device includes:
a second memory and a second processor coupled to the second memory, the second memory storing therein a second number of times authentication of the first communication device has been successful, the second number of times being counted in the first communication device, the second processor executing:
second generating a password used for authentication of the first communication device based on the second number of times, and
sending, to the second communication device, a connection request that includes the second generated password and that requests a connection to the second communication device, and
the second communication device includes:
a third memory and a third processor coupled to the third memory, the third processor executing:
receiving the registration request sent from the management device and the connection request sent from the first communication device,
comparing the password registered in accordance with the registration request with the password included in the connection request and determining whether authentication of the first communication device is successful,
notifying, when determining that the authentication of the first communication device is successful, the first communication device of a connection response that permits the connection to the second communication device, and
relaying communication between the first communication device and a server connected to the second communication device via a network.

2. The apparatus authentication system according to claim 1, wherein the first generating generates the password based on a master key unique to the first communication device and stored in the first memory and first number of times.

3. The apparatus authentication system according to claim 1, wherein the second generating generates the password based on a master key unique to the first communication device and stored in the second memory and the second number of times.

4. The apparatus authentication system according to claim 1, wherein
the second processor of the first communication device increments, when the connection response that permits the connection is notified by the second communication device, the second number of times authentication of the first communication device has been successful by one.

5. The apparatus authentication system according to claim 1, wherein
the third processor of the second communication device further executes:
sending, to the management device when the determining determines that authentication of the first communication device is successful, a connection completion notification indicating that the connection between the first communication device and the second communication device has been completed, and the first processor of the management device increments, when the connection completion notification sent from the second communication device is received by the management device, the first number of times authentication of the first communication device has been successful by one.

6. The apparatus authentication system according to claim 1, wherein the third memory of the second communication device further stores, in an associated manner, identification information and the password that are used for the first communication device and that are included in the registration request received from the management device.

7. The apparatus authentication system according to claim 6, wherein the third memory stores therein, in association with the identification information and the password used for the first communication device, identification information used for the management device.

8. The apparatus authentication system according to claim 6, wherein the third memory stores therein, in association with the identification information and the password used for the first communication device, a date and time on which the password is stored and an expiration date of the password.

9. An apparatus authentication method used in an apparatus authentication system including a first communication device and a second communication device to perform wireless communication with each other and including a management device that manages an operation of the first communication device, the apparatus authentication method comprising:

generating, using a processor of the management device, a first password used for authentication of the first communication device based on a first number of times counted by a first counter of the management device that counts the first number of times authentication of the first communication device has been successful;

sending, from the management device to the second communication device, a registration request that requests registration of the first password;

generating, using a processor of the first communication device, a second password used for authentication of the first communication device based on a second number of times counted by a second counter of the first communication device that counts the second number of times authentication of the first communication device has been successful;

sending, from the first communication device to the second communication device, a connection request that includes the second password and that requests a connection to the second communication device; and using a processor of the second communication device, comparing the first password registered in accordance with the registration request with the second password included in the connection request, determining whether authentication of the first communication device is successful, notifying, when determining that the authentication of the first communication device is successful, the first communication device of a connection response that permits the connection to the second communication device; and relaying communication between the first communication device and a server connected to the second communication device via a network.

* * * * *